United States Patent [19]

Tyler

[11] Patent Number: 5,995,758
[45] Date of Patent: Nov. 30, 1999

[54] STABILIZATION APPARATUS

[76] Inventor: Nelson Tyler, 15801 Royal Oak Rd., Encino, Calif. 90436

[21] Appl. No.: 09/016,993

[22] Filed: Feb. 2, 1998

[51] Int. Cl.$^6$ .................................................... G03B 39/00
[52] U.S. Cl. .............................................. 396/13; 248/325
[58] Field of Search ........................ 396/13, 12; 348/144, 348/147, 208, 373; 352/243; 248/325; 74/5.22, 5.34

[56] References Cited

U.S. PATENT DOCUMENTS

| | | | |
|---|---|---|---|
| 2,883,863 | 4/1959 | Karsten et al. | 74/5.22 |
| 3,638,502 | 2/1972 | Leavitt et al. | 74/5.34 |
| 4,821,043 | 4/1989 | Leavitt | 343/765 |
| 4,989,466 | 2/1991 | Goodman | 74/5.22 |
| 5,184,521 | 2/1993 | Tyler | 74/5.34 |
| 5,765,043 | 6/1998 | Tyler | 396/12 |

OTHER PUBLICATIONS

Orlosky, Scott, "Quartz Rotation (Rate) Sensor" Motion (Magazine) May/Jun. 1994, pp. 28, 30, 31.

*Primary Examiner*—W. B. Perkey
*Attorney, Agent, or Firm*—Joseph F. McLellan

[57] ABSTRACT

Stabilization apparatus for aiming an instrument such as a camera at a target object. Rotational rate sensors mounted on the camera platform detect rotation of the platform from an initial position about roll, tilt and pan axes. The sensor output signals are applied to torque motors for rotating the platform back to its initial position. A hub assembly supports the camera platform for rotation about roll and tilt axes, and a yoke supports the hub assembly for rotation about a pan axis. The yoke is adapted for suspension from a support vehicle such as a helicopter, and it supports the platform for unimpaired rotation within windowed outer and inner domes. The outer dome is rotatable about a pan axis and the inner dome is rotatable about an inclined tilt axis. The arrangement reduces the size of the window opening from the camera to the exterior, which correspondingly reduces wind loads acting against the interior of the domes.

12 Claims, 6 Drawing Sheets

STABILIZATION APPARATUS

BACKGROUND OF THE INVENTION

Field of the Invention

The present invention relates to stabilization apparatus for aiming an instrument such as a camera at a target object, and particularly to stabilization apparatus which employs rotational rate sensors mounted on the camera platform to detect rotation of the platform from its initial position, and to generate output signals for operating torque motors to rotate the platform back to its initial position.

DESCRIPTION OF THE PRIOR ART

Although the invention has broad application to the stabilization of practically any instrument carried by a vehicle, it has particular utility in stabilizing a helicopter mounted camera for filming motion pictures.

In my U.S. Pat. No. 3,352,521 (Universal Mount) and U.S. Pat. No. 3,467,350 (Vibration Damping Mount), I disclosed systems for manually steadying a helicopter mounted camera by substantially isolating the camera from helicopter induced vibrations. Such isolation can also be accomplished by gyroscopically stabilized camera support platforms, as disclosed in U.S. Pat. Nos. 3,638,502 and 4,821,043, issued to Leavitt et al, and in U.S. Pat. No. 4,989,466, issued to Goodman. Such systems use a vertical support post to which is mounted a Cardan or universal joint for suspending the camera platform on one side of the post and a gyroscope platform on the opposite side.

These platforms are housed within a spherical dome or sphere and are movable about pan, tilt and roll axes to maintain the camera in position during changes in the attitude of the helicopter. However, the degree of camera platform movement is limited by the presence of the vertically disposed support post.

My U.S. Pat. No. 5,184,521 addresses this problem by providing an external yoke structure. An analogous internal yoke is employed in the present invention to provide for free movement of the camera platform.

This structure is combined in the present invention with the subject matter of U.S. patent application No. 08/855,859, filed May 12, 1997, now U.S. Pat. No. 5,765,043 inventor Nelson Tyler. As will be seen, this combination uses windowed inner and outer domes that are alignable to provide a clear line-of-sight to the target object without exposing the camera structure to excessive wind loads.

Many of the prior art gyroscopically stabilized camera platforms employ relatively large, orthogonally arranged gyroscopes whose spinning mass provides a brute force effect in constraining the camera platform against major movement from its initial position. Any movement that did occur caused precession of one or more of the gyroscopes, and this precession was picked up by sensors that actuate relatively small torque motors to bring the platform back to its initial position.

SUMMARY OF THE INVENTION

According to the present invention, a stabilization apparatus is provided for aiming an instrument such as a camera at a target object without using the relatively large gyros of the prior art. Instead, rotation rate sensors on the platform detect any rotation of the platform from its initial position, and the output signals from these sensors are applied to torque motors to rotate the platform back to its initial position.

The platform is coupled to a hub assembly which enables rotation of the platform about roll and tilt axes. The hub assembly is supported by a yoke for rotation about a pan axis, and the yoke is suspended from the helicopter or other transporting vehicle and, because of its configuration, allows free or unimpaired rotation of the platform within the camera enclosure.

In one embodiment the enclosure comprises windowed outer and inner domes. The outer dome supports the inner dome and is "slaved" so that both domes follow rotation of the platform about the pan axis to keep the windows of the domes aligned with the camera lens. The inner dome is also rotatable about an inclined tilt axis to maintain alignment of its window with the camera lens.

Using separate alignable windows allows the effective size of the window opening to be reduced, thereby reducing wind loads upon the components located within the enclosure interior.

The camera platform includes a support portion on one side of its roll axis to support the camera, the film storage and transport mechanism, the lenses, the rotational rate sensors, and the associated equipment. On the other side of the roll axis the platform includes a balance portion which has a system of weights which can be adjustably movable to precisely balance the camera platform about all of its axes of rotation.

Although rotation or rate sensors are relatively small compared to the prior art gyroscopes, they are very sensitive and respond to minute departures of the platform from its initial position, generating error or drive signals that are applied to the servo or torque motors. These comparatively large motors quickly restore the camera platform to its initial position.

Other aspects and advantages of the present invention will become apparent from the following more detailed description taken in conjunction with the accompanying drawings.

DESCRIPTION OF A PREFERRED EMBODIMENT

As previously indicated, certain components used in the present apparatus are well known to those skilled in the art. Some are also disclosed in detail in one or more of the patents identified above. For that reason descriptions of such components and their methods of operation are generally omitted for brevity. Also, the apparatus is described in connection with a helicopter mounted, double windowed enclosure for a camera, but it will be apparent that the apparatus is equally useful in connection with various kinds of instruments, sensors and the like, other than cameras. Further, the transporting vehicle could also be a fixed wing aircraft, blimp, boat, automobile, camera dolly, etc.

In the description which follows, "vertical", "horizontal", "pan axis" and "tilt axis" are merely illustrative of an exemplary component orientation, and it will be apparent that other orientations of the windows, or of the axes of rotation of the enclosure components can be employed.

GENERAL ARRANGEMENT

Figures 1, 2:
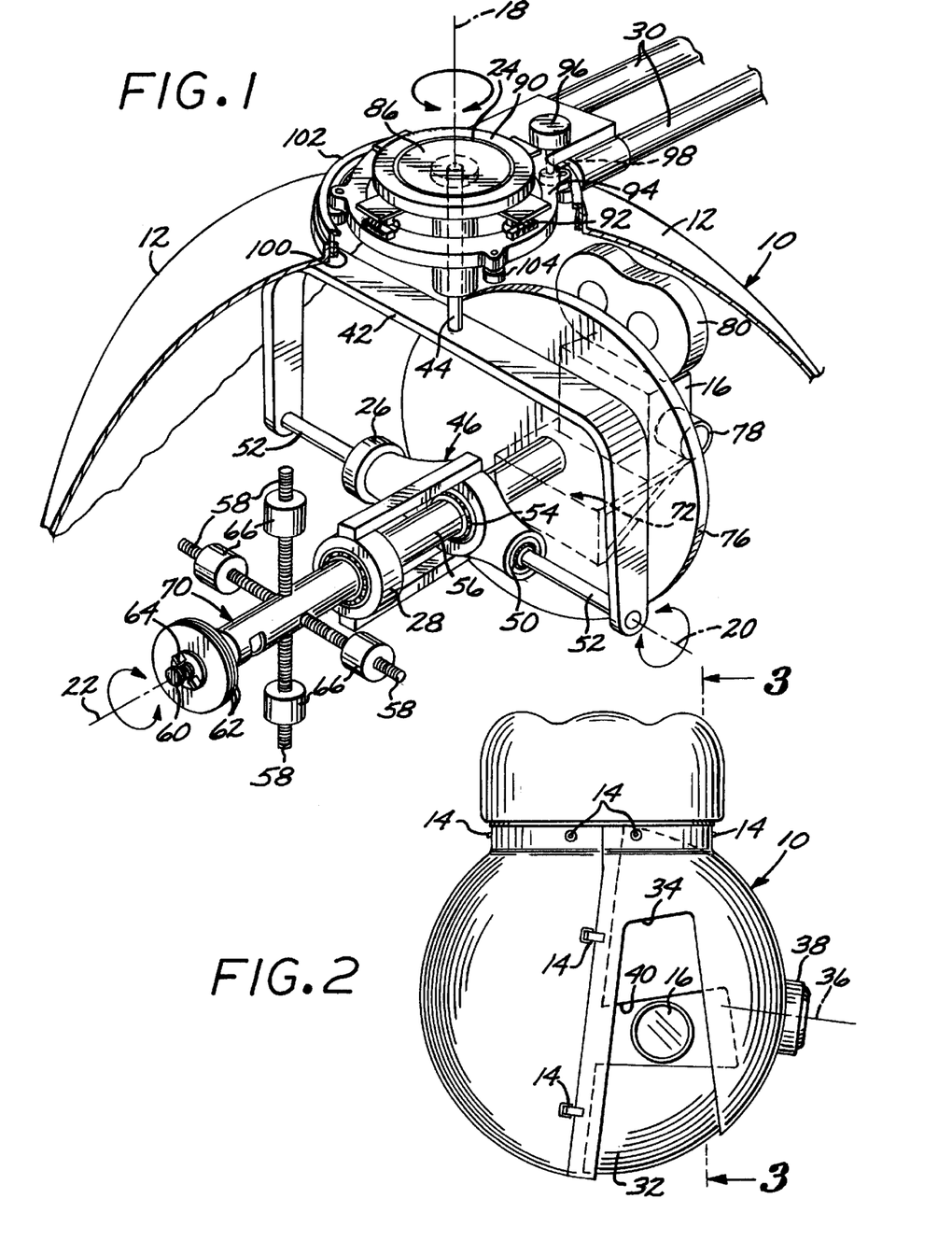
FIG. 1 is a perspective view of the present stabilizing apparatus according to the present invention, most of the dome structure being omitted for clarity, and certain parts such as the yoke and yoke support structure being shown in simplified form.
FIG. 2 is a front elevational view of the apparatus of FIG. 1, illustrating the two piece outer dome, and the inner dome which is located within the outer dome.

Referring now to the drawings, and particularly to FIGS. 1 and 2, the present apparatus comprises a fairing or enclosure 10 which in the illustrated embodiment includes a spherical outer dome 12 housing two separate half domes or sections. The sections are joined along an inclined complemental splice line. They are detachably secured together by a plurality of quick disconnect fasteners 14. Similar fasteners secure the upper margins of the outer dome halves to a dome mounting ring 102.

Figure 4:
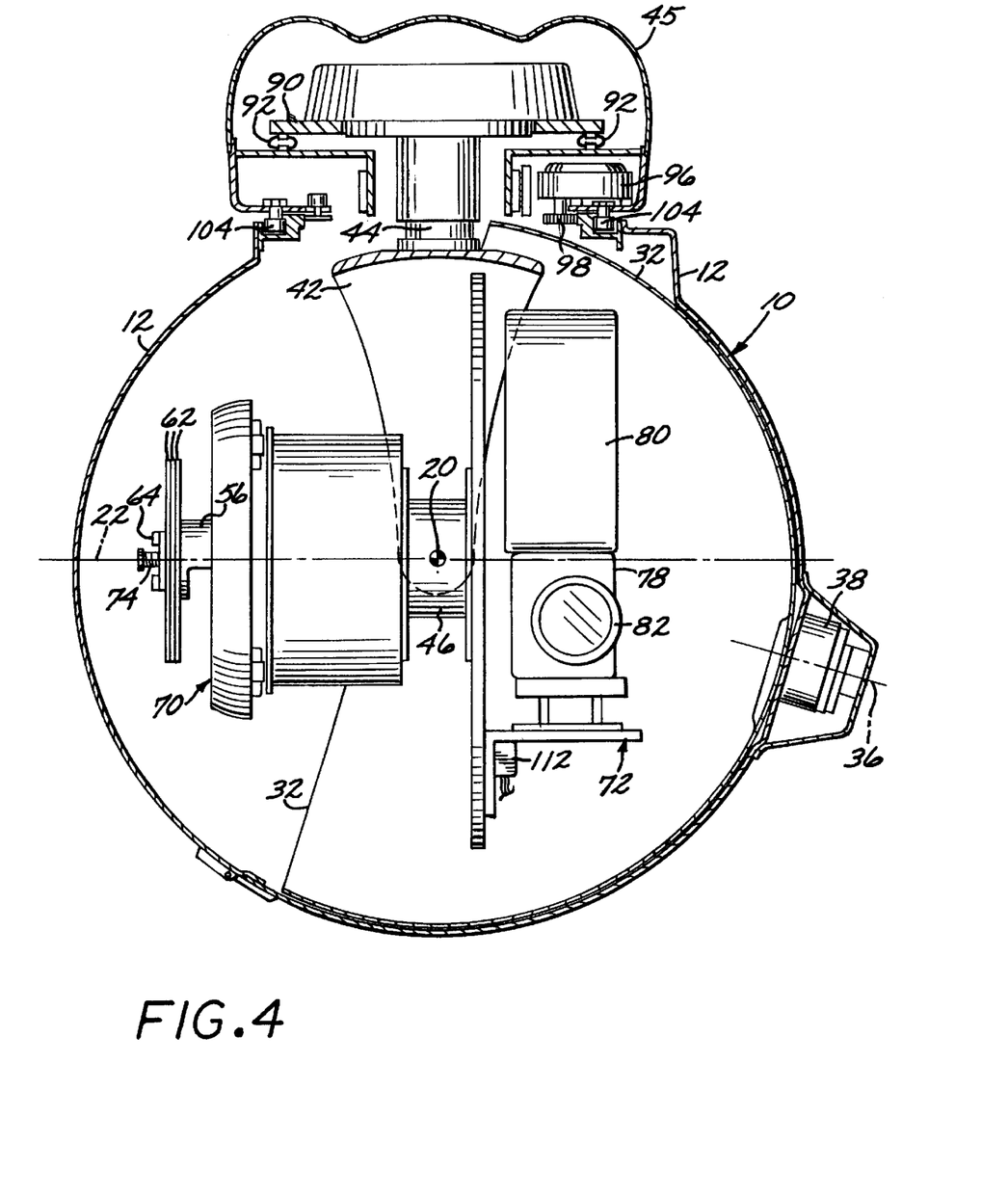
FIG. 4 is a view taken along the line 4—4 of FIG. 3.

The enclosure 10 is adapted to house a camera 16 carried by the support portion 72 of a camera platform for rotation about a vertical pan axis 18, a horizontally oriented fore and aft roll axis 20, and a tilt axis 22, as seen in FIG. 4. Rotations of the camera platform about these axes are accomplished by a pan motor 24, a roll motor 26 and a tilt motor 28 under the control of a computer (not shown) or a human operator. Details of such motors, the computer, and the associated electrical connections, conduits and leads are omitted from the drawings for brevity and simplicity, inasmuch as they are well known in the art.

The enclosure 10 is made of opaque, structurally rigid material to prevent entry of unwanted light and to resist air buffeting and wind loads. It is supported by a pair of arms or similar structure (generally indicated at 30) attached to the helicopter (not shown) or other transporting vehicle.

The outer dome 12 supports an inner dome 32 for common rotation with the outer dome about the pan axis 18 by a dome drive motor 96. A suitable servo control system (not shown) is responsive to panning movement of the camera 16 by the pan motor 24 to pan the outer dome 12 to maintain an opening or outer window 34 in the dome 12 aligned with the lens of the camera 16.

The inner dome 32 is supported by the outer dome 12 for rotation about an inclined tilt axis 36 by an inner dome tilt motor 38. A suitable servo control system (not shown) tilts the inner dome 32 in response to tilting of the camera 16 to maintain continuous alignment of an inner window 40 of the inner dome 32 with the camera lens. In this manner the inner and outer windows 40 and 34 are kept in alignment with the camera line of sight.

Thus, when the camera aiming controls are operated to align the camera line-of-sight with a target object, panning and tilting of the camera platform continues until the associated sensors and servo circuits (not shown) determine that the position of the camera line-of-sight is in agreement with the input from the camera aiming controls.

Simultaneously, the inner and outer domes rotate to maintain the outer and inner windows 34 and 40 in alignment with each other and with the camera line-of-sight. Reference is made to the above-identified patent application Ser. No. 08/855,859, filed May 12, 1997, inventor Nelson Tyler, incorporated herein by reference, for a more detailed explanation of the alignment of the windows.

CAMERA PLATFORM AND DOME MOUNTING STRUCTURE

Figure 3:
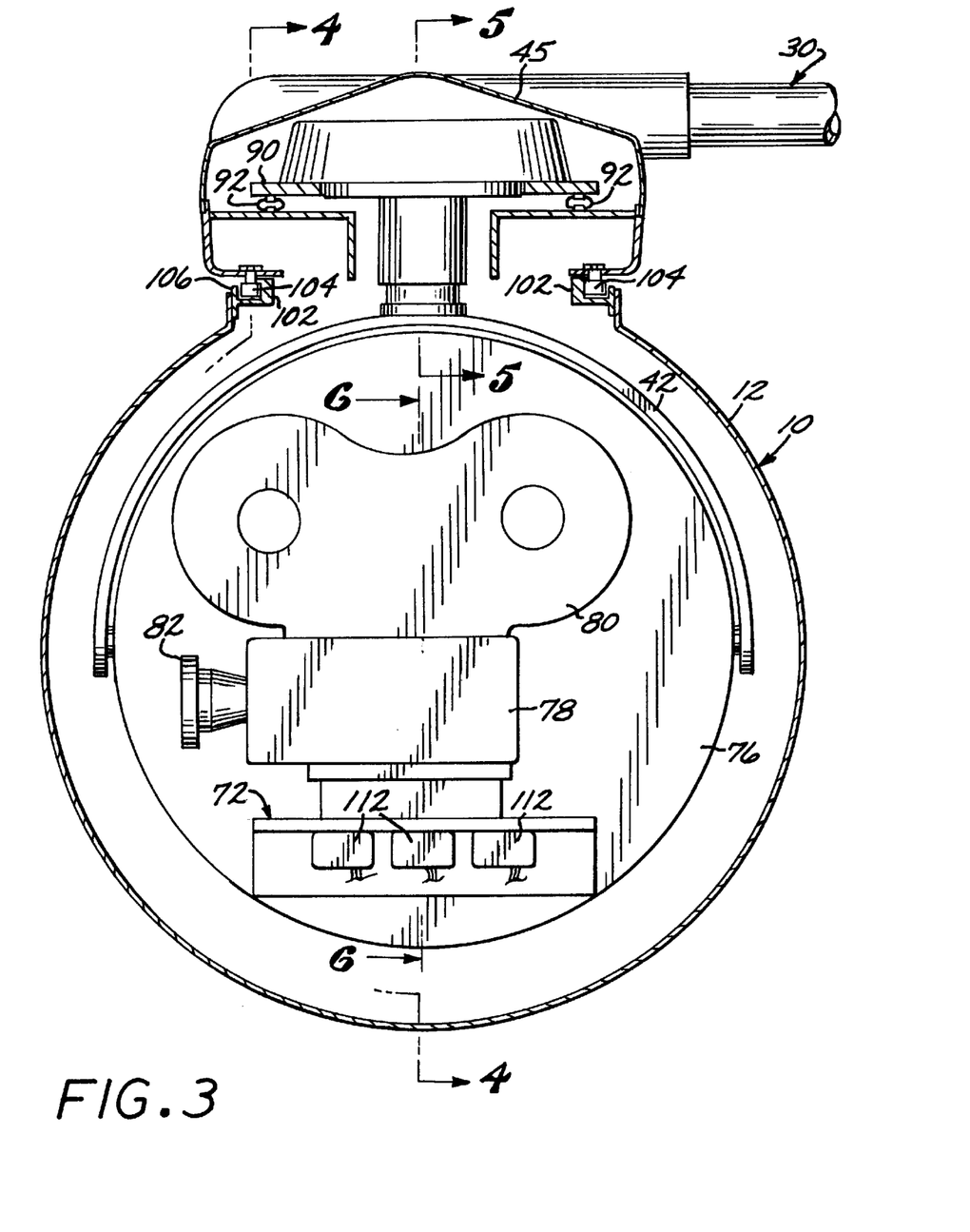
FIG. 3 is an enlarged view taken along the line 3—3 of FIG. 2.
Figure 5:
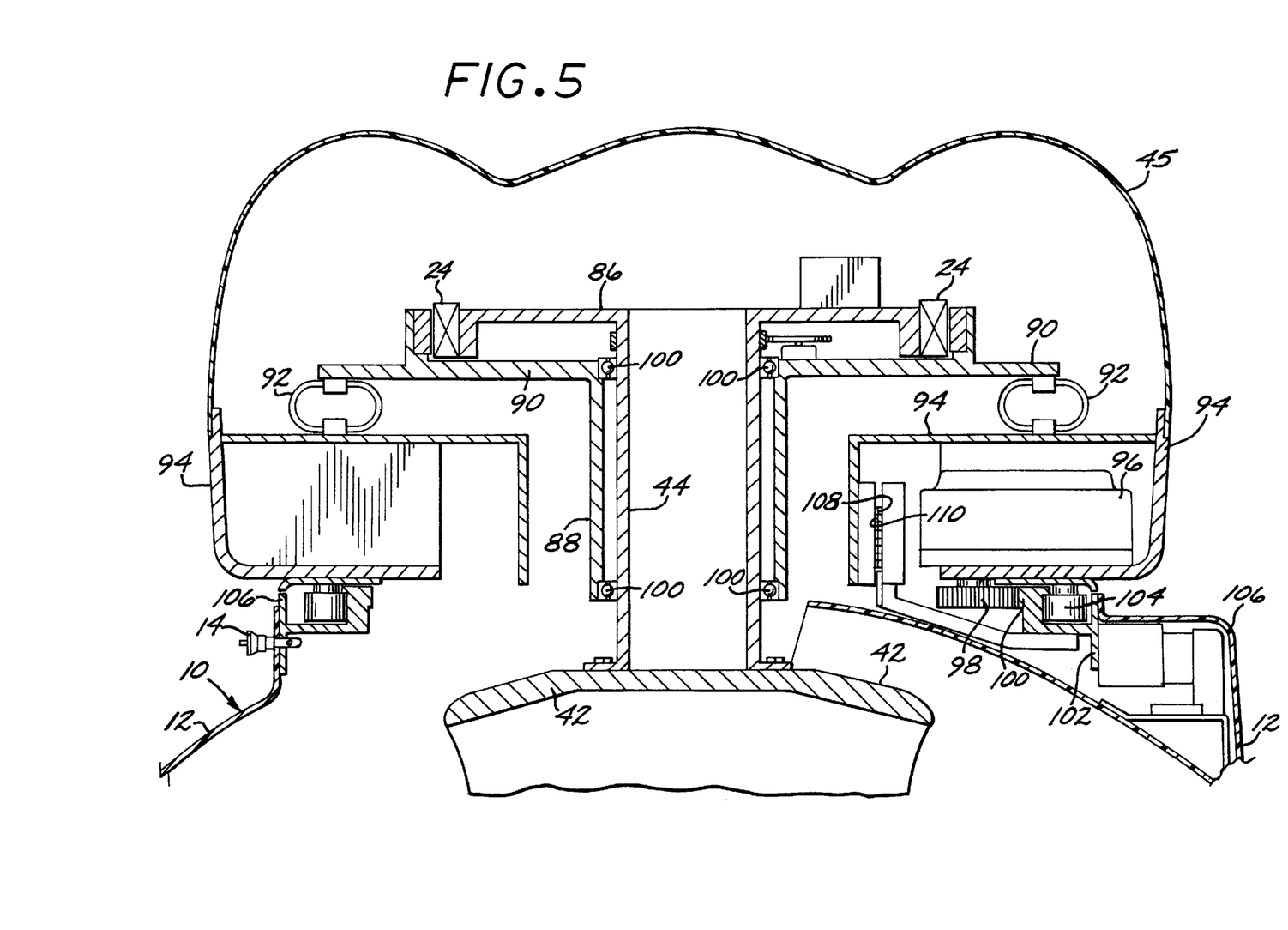
FIG. 5 is an enlarged view taken along the line 5—5 of FIG. 3.

With particular reference to FIGS. 3–5, the structure for mounting the foregoing components to a helicopter includes an inverted U-shape internal yoke 42. It is oriented in general alignment with the roll axis 20 and is freely movable within the inner and outer domes. The upper portion of the yoke is attached to a vertically oriented drive shaft 44 operated by the pan motor 24. The shaft 44 extends externally of the outer dome into a dome support structure 45 that is attached to the support structure 30. Details respecting a similar support assembly are set forth in the above-identified U.S. Pat. No. 5,184,521, issued Feb. 9, 1993, inventor Nelson Tyler.

Figure 7:
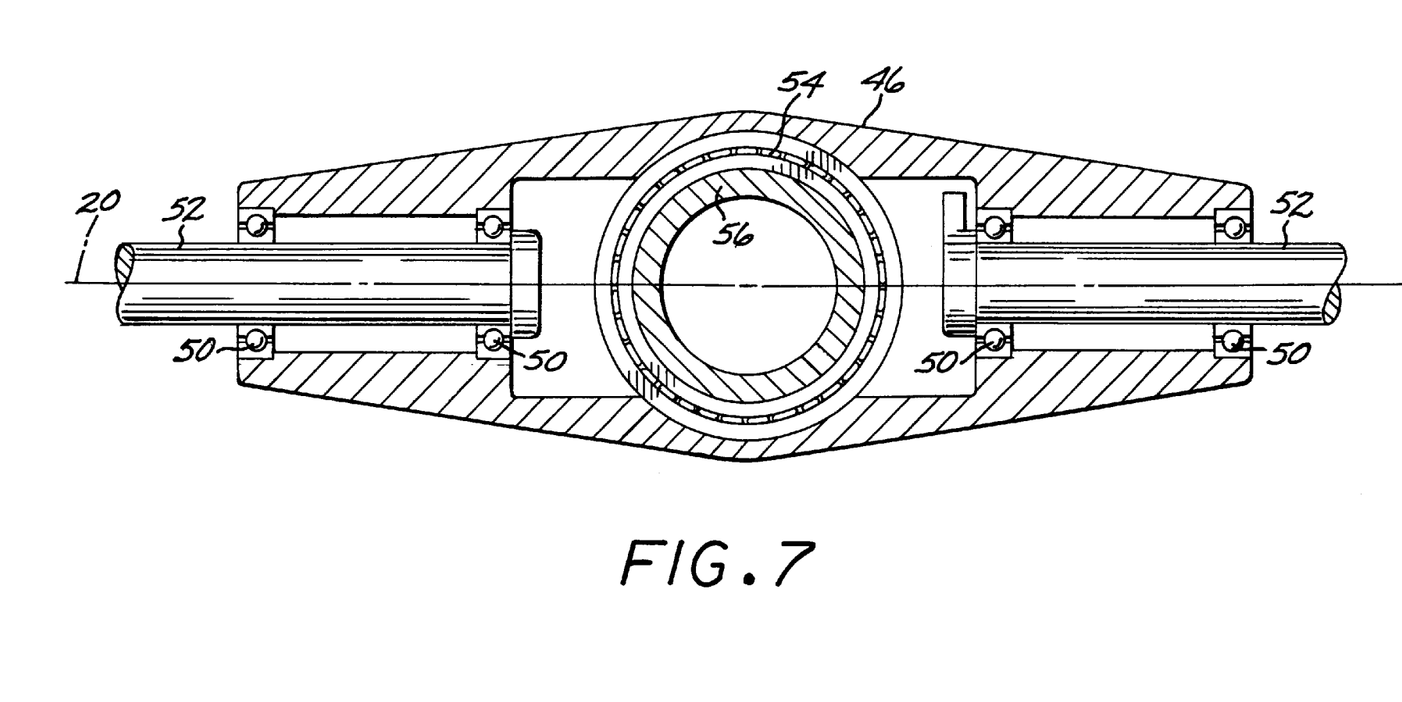
FIG. 7 is an enlarged view taken along the line 7—7 of FIG. 6.

The yoke 42 supports the outer ends of a pair of stub shafts 52 which extend along the roll axis 20, as best seen in FIG. 7. The inner extremities of the shafts 52 are rotatably supported by pairs of spaced apart bearings 50 carried by an elongated hub assembly 46.

Figure 6:
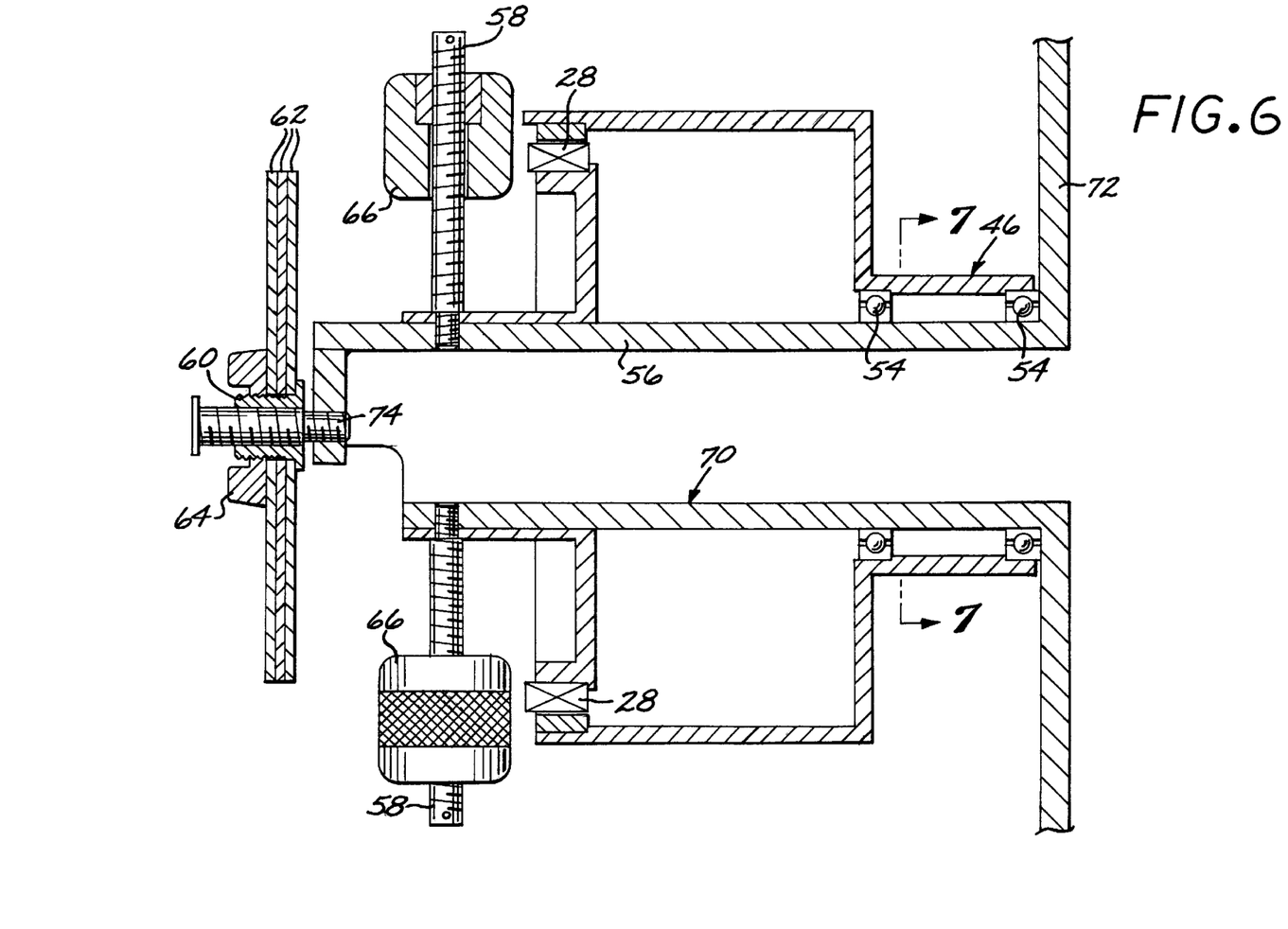
FIG. 6 is an enlarged partial view taken along the line 6—6 of FIG. 3.

The assembly 46 includes an elongated central portion or opening through which a shaft 56 extends at right angles to the stub shafts 52. The shaft 56 extends along the tilt axis 22, and is rotatably supported by a pair of spaced apart bearings 54 which form part of the hub assembly 46, as best seen in FIG. 6.

One extremity of the shaft 56, as also seen in FIG. 1, supports a pair of rods 58 which extend at right angles to each other into the shaft 56. The end of the shaft 56 is threaded and mounts an externally threaded collar 60, the collar 60 also being internally threaded for threaded connection to a stub shaft 74 which is mounted to one extremity of the shaft 56, as also seen in FIG. 6. The collar has an exterior flat (not shown) which is engaged by complemental interior flats (not shown) on each of a plurality of circular weights 62.

The circular weights 62 are slidable over the collar 60 and are held in position by a wing nut 64 which is threaded onto the collar. With this arrangement, rotation of the weights 62 also rotates the collar 60 and adjustably positions it longitudinally along the stub shaft 74. The wing nut 64 is then tightened to urge the weights 62 against the flange of the collar 60 and fix them in position.

An internally threaded weight 66 is threaded onto each extremity of the four rods 58. Each weight 66 preferably includes a friction element urged by a spring (not shown) against the associated rod 58 to constrain the weight against inadvertent or vibrational movement out of its adjusted position.

The structure just described comprises a balance portion 70 which lies on the side of the roll axis 20 opposite the support portion 72 that supports the camera 16. The positions of the weights 58 and 62 are individually adjustable to balance all of the structure of the camera platform about the pan, roll and tilt axes 18, 20 and 22, respectively.

The weights 62 and 66 are particularly useful when a camera or lens is substituted for the original camera or lens and there is a difference in weight that must be compensated. This is quickly and easily done with the described arrangement.

When properly adjusted, the camera platform, including the balance portion 70 and the support portion 72 which carries the camera 16, are relatively fixed in an initial position in space. If any external force moves it from this initial position, it will tend to return to the initial position. This return movement is aided by operation of one or more of the pan, roll and tilt motors 24, 26 and 28 acting in response to the sensors 112, as will be apparent.

The support portion 72 includes a circular wall or plate 76 which is attached to the shaft 56 and which supports the camera 16, the film magazine 80, the lens 82, the camera transport mechanism, and associated structure. With this arrangement, rotation of the plate 76 with the shaft 56 rotates the support portion 72 about the tilt axis 22.

As best seen in FIG. 5, the upper end of the vertical support shaft 44 is connected to a pan motor inner ring 86 so that rotation of the ring 86 rotates the shaft 44 and the yoke 42 about pan axis 18.

Integral with the inner ring 86 is a vertical cylinder or shaft 44 which is rotatably supported upon a vertical outer ring support tube 88 by a pair of vertically spaced apart bearings 100. The tube 88 is integral with a pan motor outer ring 90 that is fixed relative to the helicopter (not shown) by connection to a plurality of circumferentially spaced apart vibration isolators 92. The isolators 92 are fixed to isolator support structure 94 that is fixed to the non-rotatable dome support structure 45. The structure 45 in turn is fixed to the helicopter by the support arms 30.

The isolators 92 are preferably made of resilient material such as springs or wire rope material adapted to isolate the vibrations of the helicopter from the inner and outer domes 32 and 12 while supporting the outer ring 90.

The isolator support structure 94 also supports a dome drive motor 96 which has a drive gear 98. The drive gear 98 meshes with a circumferentially extending gear rack or ring gear 100. The rack 100 is carried by a dome mounting ring 102 to which the outer dome 12 is attached. Thus, the outer dome 12 can be rotated or panned by operation of the motor 96.

The lower portion of the support structure 94 mounts the vertical shafts of a plurality of dome support bearings 104 which are circumferentially spaced around the periphery of the isolator support structure 94. Each bearing 104 includes a wider roller portion that projects below the structure 94 and underlies a circumferential, inwardly disposed flange of the dome mounting ring 102 to rotatably support the ring 102.

The dome mounting ring 102 is fixed to a bracket structure 106 that is detachably connected to the outer dome 12 by means of a plurality of the quick release fasteners 14.

The orientation and operation of most of the electrical circuitry and components associated with the present invention are omitted because suitable systems are well known in the art. Briefly, a plurality of slip rings 108 are mounted to a depending central cylindrical flange of the isolator support structure 94. The slip rings 108 are engageable, respectively, with a plurality of electrical contact brushes 110 that are mounted to a brush block that is coupled and rotates with the dome mounting ring 102.

Engagement between the rings 108 and brushes 110 enables energization of the various motors, camera controls, etc. located within the enclosure 10. Electrical cables (not shown) extend from a control console (not shown) located inside the passenger compartment of the helicopter to the slip rings 108 and brushes 110. From there other electrical cables or leads extend to servo motors and other components for rotating the camera about its various axes of rotation, for turning the camera on and off, controlling camera motor speed, zoom lens position, iris opening position, etc. Aiming or viewing of the camera 16 is accomplished by use of a video monitor (not shown) mounted on the passenger compartment control console, either deriving its images from a video camera (not shown) or from a video tap mounted on the camera itself Electrical power for these operations is supplied by on board or carry on batteries in the helicopter.

STABILIZATION APPARATUS

Referring now to FIGS. 3 and 4, the unique stabilization apparatus of the present invention does not utilize the relatively large gyroscopes of the prior art. Instead, three orthogonally arranged rate sensors 112 are employed to sense any movement of the camera platform. As seen in FIGS. 3 and 4, the sensors 112 are fixed or otherwise tightly coupled to the support portion 72 to which the camera 16 is fixed. Through suitable control circuitry (not shown) the sensors 112 develop control or output signals when the support portion 72 of the camera platform rotates about one or the other of the pan, tilt or roll axes. These signals are applied to suitable torque or servo motors such as the motors 24, 26 and 28. These are fairly large, each being about 22 foot pound torque motors.

Although various means could be employed to detect camera platform movement, the relatively small sensors 112 are preferred. Each sensor is only approximately a half inch thick and about one and one-half inches in diameter, but it is extremely responsive to the slightest degree of platform movement.

One suitable type of rate sensor is a quartz rate sensor (QRS) manufactured by BEI Systron Donner, Inertial Division located in Concord, Calif. It is an active system which requires little power to operate and activates the associated servo system for maintaining the camera support portion 72 and the associated camera platform stationary, despite movement of the transporting helicopter.

The small size of the sensors 112 and their long operating life contrast with the large, heavy prior art spinning wheel gyroscopes which require considerable power to operate, and which tend to wear out in a relatively short time.

As is well known in the operation of such a system, the circuitry is also adapted to receive control signals initiated by the camera operator to move the camera independently of the action of the servo motors.

OPERATION

Once the camera platform components are mounted and ready for operation, the camera platform is initially balanced about its three axes by adjustably positioning the weights 62 and 66 of the balance portion 70 of the camera platform. This is done in the embodiment illustrated by threading them one way or the other relative to the structure upon which they are mounted.

For example, the weights 62 are moved one way or the other along the tilt axis 22 until the balance portion 70 and the camera support portion 72 are balanced on both sides of the roll axis 20 so that they do not tend to rotate about the roll axis 20.

Next, the weights 66 that are located on the rod 58 which is horizontally oriented in FIG. 1 are moved for and aft along the rod 58 until the balance portion 70 and the camera support portion 72 are balanced so that they do not tend to rotate about the tilt axis 22. Further balancing about the tilt axis may be required if, for example, the camera 80 is top heavy. If this were the case the camera 80 will tend to rotate about the tilt axis. This imbalance can be corrected by moving up and down the weights 66 which are located on the rod 58 that is vertically oriented in FIG. 1 until balance is achieved.

The number, location and weight of each weight 66 can be selected as required to best achieve the desired balance. For example, both of the weights on a rod 58 can be mounted to the same extremity of the rod if necessary to correct for an extreme imbalance. Similarly, the material of which particular weights are made could be selected to achieve the desired torque or moment. Also, additional weights could be added, as will be apparent.

In any event, use of the balance portion 70, or an equivalent balance structure, makes it easy for an operator of the present stabilization apparatus to quickly compensate for changes in weight and weight distribution which may be encountered in using different sizes of film magazine, different cameras, or different lenses, etc.

Once a balance or condition of equilibrium has been established for the camera, any movement of the camera in operation away from the equilibrium position will be picked up by the sensors 112, triggering operation of the servo motors 24, 26 and 28 to bring the camera back into equilibrium.

Next, actuation of the camera aiming controls aligns the camera line-of-sight with the target object. The pan motor 24 acting through the yoke 42 pans the camera 16 about the pan axis 18. The tilt motor 28 simultaneously tilts the camera 16 about the tilt axis 22. This continues until the sensors and servo circuits determine that the position of the camera line-of-sight is in agreement with the camera aiming controls.

Simultaneously, the dome drive motor 96 pans the connected outer and inner domes 12 and 32 in correspondence with panning of the camera 16, thereby aligning the outer window 34 with the camera line-of-sight.

Also simultaneously, the camera aiming controls actuate the inner dome tilt motor 38 to tilt the inner dome 32 about the inclined tilt axis 36 in correspondence with the tilting rotation of the camera 16 about its horizontal tilt axis 22. This brings the inner window 40 into alignment with the outer window 34 to define a relatively small opening in alignment with the camera line-of-sight.

Also simultaneously, any movement of the camera 16 about the roll axis 20 occasioned by operation of the camera aiming controls, or by banking of the helicopter, actuates the roll motor 26 to roll the camera about the roll axis 20 until the camera platform is stabilized.

It is an important feature of the present invention that the output of the roll sensor 112 can be adjustably electrically biased by the operator to place the camera platform at a selected inclined attitude, compared to the horizontal attitude in which the camera is normally stabilized by the system. This provides heightened realism in filming. In a sequence involving aerial pursuit of a fugitive, for example, the viewer sees the camera image rolling just as the viewer would see it from a banking helicopter.

Other noteworthy features of the invention include: use of the yoke 42 arranged in suspended relation to the pan axis vertical shaft 44. This enables all parts of the yoke, and the structure supported by the yoke, to be freely rotatable with the yoke within the enclosure 10 and about the pan axis 18; positioning the camera platform for free rotation within the yoke 42 about the tilt axis 22 and about the roll axis 20; and the alignment of the yoke 42 with the roll axis 20 so that the camera line-of-sight passes to one side of the yoke parallel to the roll axis.

The result of the arrangement described is an absence of any contact between the enclosure components and the components of the movable internal structure as the latter moves inside the enclosure. This also enables the operator to bank the helicopter to a much greater degree than was previously possible, and still maintain a clear line-of-sight from the camera to the target object.

Other changes and modifications will be readily apparent to persons skilled in the art. Therefore, the invention is not intended to be limited except by the scope of the following appended claims.

What is claimed is:

1. Stabilization apparatus for aiming an instrument at a target object, the apparatus comprising:

a hub assembly rotatable about a first axis;

an instrument platform supported by the hub assembly for rotation about a second axis perpendicular to the first axis, and including a support portion laterally offset from the first axis for supporting the instrument, and further including a balance portion laterally offset from the first axis oppositely of the support portion for balancing the weight of the instrument platform about the first and second axes;

yoke means having opposite extremities and an intervening open space, the opposite extremities of the yoke means supporting the hub assembly for free rotation of the hub assembly and instrument platform about the first axis within the open space;

support means coupled to the yoke means for supporting the yoke means for rotation about a third axis perpendicular to the first and second axes;

drive means for rotating the hub assembly and yoke means;

sensing means operative to generate output signals proportional to any changes in rotational velocity of the instrument platform about the first, second and third axes; and control means for operating the drive means in response to a human operator and the output signals generated by the sensing means.

2. An apparatus according to claim 1 wherein the drive means comprises:

a first torque motor for rotating the hub assembly about the first axis;

a second torque motor for rotating the hub assembly about the second axis; and a third torque motor for rotating the yoke means about the third axis.

3. An apparatus according to claim 1 wherein the sensing means comprises at least three orthogonally arranged rotational velocity sensors mounted to the instrument platform.

4. An apparatus according to claim 1 wherein the first, second and third axes are, respectively, roll, tilt and pan axes for the instrument.

5. An apparatus according to claim 1 wherein the hub assembly includes a pair of hub shafts having outer extremities connected, respectively, to the opposite extremities of the yoke means, and wherein the yoke means is of U-shape configuration to define the opposite extremities and the intervening space of the yoke means.

6. An apparatus according to claim 1 wherein the yoke means includes a central portion between the opposite extremities of the yoke, and the central portion is coupled to the support means.

7. An apparatus according to claim 4 and including a dome drive motor, an enclosure surrounding the instrument platform, with the yoke means being located interiorly of the enclosure, the enclosure comprising an outer dome coupled to the dome drive motor, and further comprising an inner dome coupled to the outer dome for rotation therewith about the pan axis.

8. An apparatus according to claim 1 wherein the support means includes at least one support arm adapted for connection to a transporting vehicle, and including vibration isolation means interposed between the yoke means and the support arm.

9. Stabilization apparatus for aiming a camera at a target object, the apparatus comprising:

a hub assembly rotatable about a roll axis;

an instrument platform supported by the hub assembly for rotation about the roll axis and about a tilt axis perpendicular to the roll axis, and including a support portion laterally offset from the roll axis for supporting the camera, and further including a balance portion laterally offset from the roll axis oppositely of the support portion for balancing the weight of the instrument platform about the roll and tilt axes;

yoke means supporting the hub assembly for rotation of the instrument platform about the roll axis without impingement of the instrument platform against the yoke means, the support portion being arranged to support the camera for alignment of its line-of-sight along the roll axis to one side of the yoke means whereby the line-of-sight does not intersect the yoke means; and support means supporting the yoke means for rotation about a pan axis perpendicular to the roll and tilt axes.

10. An apparatus according to claim 9 wherein the hub assembly includes a pair of hub shafts having outer extremities, respectively, and the yoke means comprises opposite extremities and an intervening open space, the opposite extremities of the yoke means being coupled to the opposite extremities of the pair of hub shafts for free rotation of the hub assembly and instrument platform about the roll axis.

11. An apparatus according to claim 9 and including a dome drive motor, an enclosure surrounding the hub assembly, instrument platform and yoke means, the enclosure having an outer dome coupled to the dome drive motor, and further comprising an inner dome coupled to the outer dome for rotation therewith about the pan axis.

12. An apparatus according to claim 11 wherein the outer dome includes an elongated first window, and the inner dome is located within the outer dome and includes a second window extending transversely relative to the first window, and wherein the outer dome supports the inner dome for rotation about an inner dome tilt axis which is inclined relative to the instrument platform tilt axis; and inner dome drive means operative to rotate the inner dome about the inner dome tilt axis to bring the second window into alignment with the camera line-of-sight.

\* \* \* \* \*